United States Patent
Ferentz et al.

(10) Patent No.: US 9,281,691 B2
(45) Date of Patent: Mar. 8, 2016

(54) DETECTION FOR FOUR PAIR POWERED DEVICES

(71) Applicant: Microsemi Corp.—Analog Mixed Signal Group, Ltd., Hod Hasharon (IL)

(72) Inventors: Alon Ferentz, Bat Yam (IL); Roni Blaut, Kfar Horeah (IL)

(73) Assignee: Microsemi Corp.—Analog Mixed Signal Group, Ltd., Hod Hasharon (IL)

( * ) Notice: Subject to any disclaimer, the term of this patent is extended or adjusted under 35 U.S.C. 154(b) by 511 days.

(21) Appl. No.: 13/769,968

(22) Filed: Feb. 19, 2013

(65) Prior Publication Data

US 2013/0257161 A1    Oct. 3, 2013

Related U.S. Application Data

(60) Provisional application No. 61/617,172, filed on Mar. 29, 2012.

(51) Int. Cl.
*H02J 4/00* (2006.01)
*H04L 12/10* (2006.01)

(52) U.S. Cl.
CPC . *H02J 4/00* (2013.01); *H04L 12/10* (2013.01); *Y10T 307/696* (2015.04)

(58) Field of Classification Search
CPC .......... H02J 4/00; H04L 12/10; Y10T 307/696
USPC ........................................................ 307/80
See application file for complete search history.

(56) References Cited

U.S. PATENT DOCUMENTS

| 7,145,439 | B2 | 12/2006 | Darshan et al. |
| 7,299,368 | B2 | 11/2007 | Peker et al. |
| 7,492,059 | B2 | 2/2009 | Peker et al. |
| 7,509,114 | B2 | 3/2009 | Berson et al. |
| 7,593,756 | B2 | 9/2009 | Ferentz et al. |
| 7,898,406 | B2 | 3/2011 | Darshan et al. |
| 2006/0019629 | A1* | 1/2006 | Berson et al. ............... 455/402 |
| 2010/0194335 | A1 | 8/2010 | Kirby et al. |
| 2012/0002666 | A1 | 1/2012 | Miller |

OTHER PUBLICATIONS

HDBaseT Specification Version 1.1.0, pp. 151-187, published Jul. 12, 2011, HDBaseT Alliance.

(Continued)

*Primary Examiner* — Rexford Barnie
*Assistant Examiner* — Toan Vu
(74) *Attorney, Agent, or Firm* — Simon Kahn

(57) ABSTRACT

A twin power sourcing equipment constituted of: a first power sourcing equipment; and a second power sourcing equipment arranged for connection to a powered device over respective power paths; the first and second power sourcing equipments arranged to: simultaneously perform detection of the powered device; and in the event that at least one of the first and second power sourcing equipments detects the presence of the powered device, alternately perform detection of the powered device to detect a signature impedance; and in the event that each of the alternate detection is indicative of the presence of the signature impedance, provide power to the powered device simultaneously by the first and second power sourcing equipment. Power is not provided to the powered device in the event that the simultaneous detection is indicative of the absence of the powered device on each of the first path and the second path.

14 Claims, 6 Drawing Sheets

(56) References Cited

OTHER PUBLICATIONS

IEEE 802.3af-2003 Specification, pp. 29-57, 94-96, 102, 115, published 2003 by IEEE, New York.
IEEE 802.3at-2009 Specification, pp. 22-67, published 2009 by IEEE, New York.
International Search Report of the European Patent Office mailed Jul. 16, 2013 for parallel PCT application PCT/IL2013/050147.
Written Opinion of the International Searching Authority, prepared by the European Patent Office mailed Jul. 16, 2013 for parallel PCT application PCT/IL2013/050147.

* cited by examiner

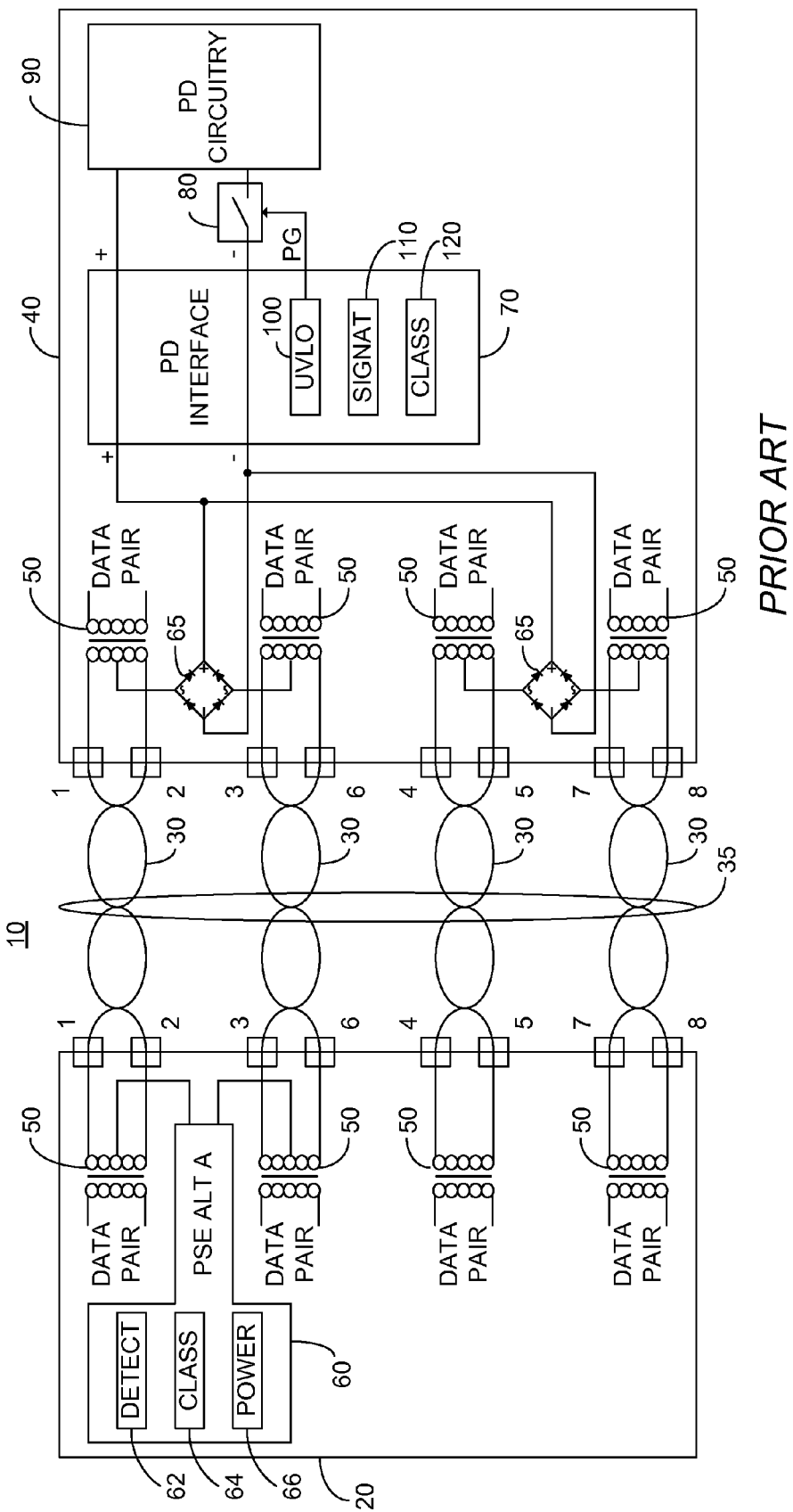
FIG. 1A *PRIOR ART*

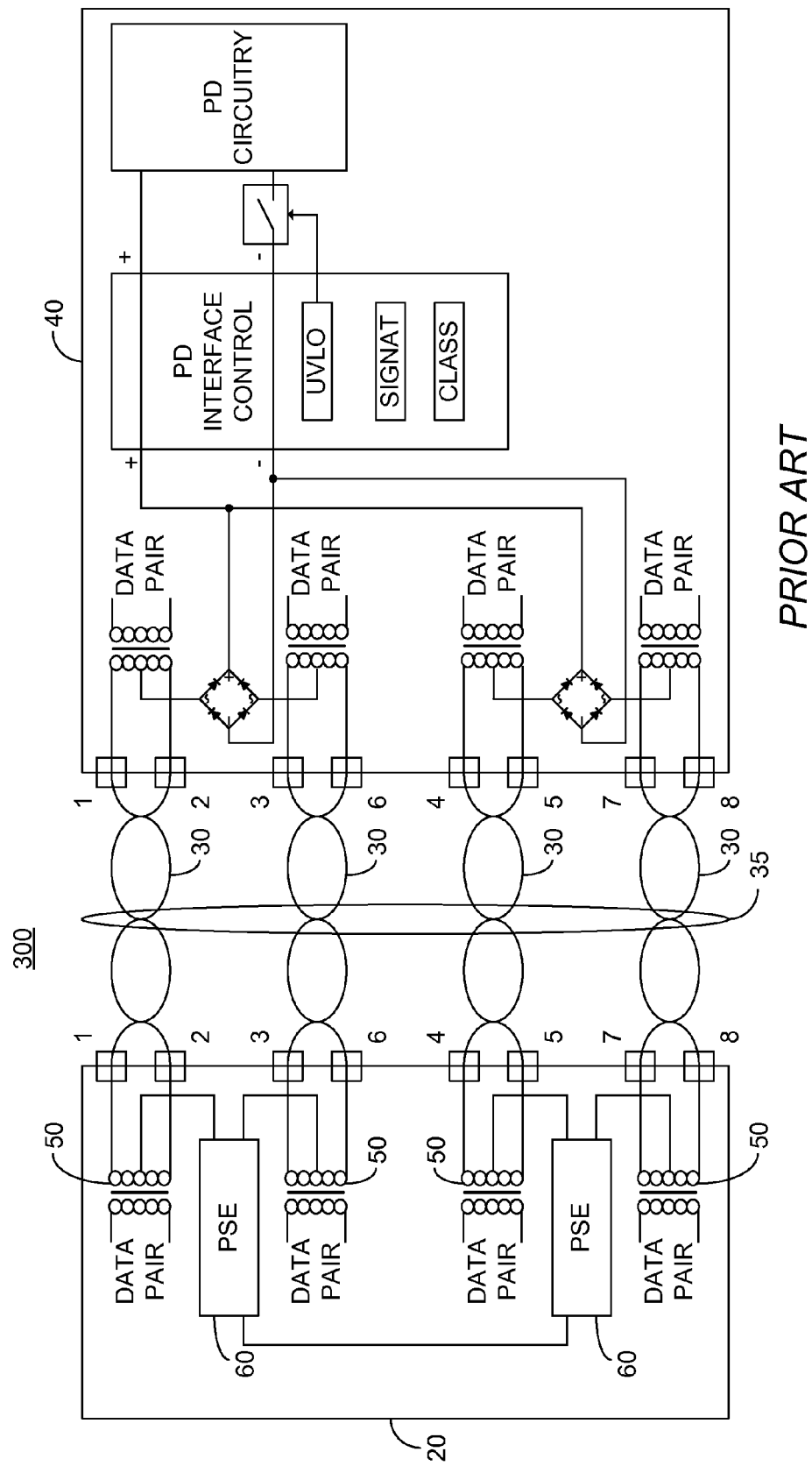
FIG. 1C *PRIOR ART*

FIG. 1D  *PRIOR ART*

DETECTION FOR FOUR PAIR POWERED DEVICES

BACKGROUND OF THE INVENTION

The invention relates generally to the field of power over local area networks, particularly Ethernet based networks, and more particularly to a method of detection and determination of a type of powered device attached over four twisted wire pairs.

Power over Ethernet (PoE), in accordance with both IEEE 802.3af-2003 and IEEE 802.3at-2009, each published by the Institute of Electrical and Electronics Engineers, Inc., New York, the entire contents of each of which is incorporated herein by reference, defines delivery of power over a set of 2 twisted wire pairs without disturbing data communication. The aforementioned standards particularly provide for a power sourcing equipment (PSE) and a powered device (PD). The power sourcing equipment is configured to detect the PD by ascertaining a valid signature resistance, and to supply power over the 2 twisted wire pairs only after a valid signature resistance is actually detected.

U.S. Pat. No. 7,492,059 issued Feb. 17, 2009 to Peker et al, the entire contents of which is incorporated herein by reference is addressed to powering a PD over 4 twisted wire pairs. Such a technique provides for increased power as compared to either of the above mentioned standards, and is commercially available from Microsemi Corporation of Alisa Viejo, Calif.

The HD BaseT Alliance of Beaverton Oregon has published the HDBaseT Specification Version 1.1.0 which defines a high power standard utilizing twisted wire pair cabling, such as Category 5e (CAT 5e) or Category 6 (CAT 6) structured cabling as defined by ANSI/TIA/EIA-568-A. The specification provides for even higher power than the above mentioned IEEE 802.3at-2009 over each set of 2 pairs, with all 4 pairs utilized for powering, and allows for power over structured communication cabling from any of: a type 1 PSE, denoted hereinafter as a low power PSE, typically meeting the above mentioned IEEE 802.3af standard; a type 2 PSE denoted hereinafter as a medium power PSE, typically meeting the above mentioned IEEE 802.3at standard; a type 3 PSE, denoted hereinafter as a high power PSE, typically meeting the above HDBaseT specification; twin medium power PSEs; and twin high power PSEs.

Detection, in accordance with any of the above standards requires the supply of at least 2 voltage levels between the range of 2.8 volts and 10 volts, with a signature resistance of the PD determined based on a calculation of the actual voltage levels, or current, detected. The use of 2 voltage levels allows for determination of the signature resistance irrespective of the existence of a diode bridge, typically supplied at the input to the PD.

Twin medium power PSEs or twin high power PSEs may be paired with any type of PD, i.e. a PD which is arranged to receive power over only 2 sets of twisted wire pairs, or a PD which is arranged to receive power over 4 sets of twisted wire pairs, without limitation, and thus the twin medium power PSEs or twin high power PSEs must be designed to properly detect the PD irrespective of its arrangement. In the event that a PD arranged to receive power over only 2 sets of twisted wire pairs is connected, simultaneous detection by each of the twin PSEs would interfere with proper detection, as described in further detail in U.S. Pat. No. 7,492,059, issued Feb. 17, 2009 to Peker et al, and U.S. Pat. No. 7,595,756 issued Sep. 22, 2009 to Ferentz, the entire contents of both of which are incorporated herein by reference. Similarly, a PD which is supplied without a diode bridge, or in the event that two separate PDs are supplied, one on each 2 sets of twisted wire pairs, can only be properly detected by performing detection on each of the 2 sets of twisted wire pairs.

FIG. 1A illustrates a high level schematic diagram of an alternative A

PoE powering arrangement 10, according to the prior art, comprising: a switch/hub 20; a plurality of twisted wire pairs 30 constituted within a structured cable 35; and a PD 40. Switch/hub 20 comprises a plurality of data transformers 50 and a PSE 60. PD 40 comprises: a plurality of data transformers 50; a first and a second diode bridge 65; a PD interface 70; an electronically controlled switch 80; and a PD load circuitry 90. PD interface 70 comprises: an under-voltage lockout (UVLO) circuit 100; a signature impedance 110; and a class current source 120. Optionally, a class event counter is further supplied (not shown). PSE 60 comprises a detection functionality 62, a classification functionality 64 and a powering functionality 66, each of which may be constituted in a dedicated circuitry, or as a programmed functionality for a computing element, without limitation. A data pair is connected across the primary of each data transformer 50 in switch/hub 20 and a first end of each twisted wire pair 30 is connected across the secondary of each data transformer 50 in switch/hub 20 via respective connections, listed conventionally in two groups: connections 1, 2, 3, 6; and connections 4, 5, 7 and 8. The outputs of PSE 60 are respectively connected to the center taps of the secondary windings of data transformers 50 of switch/hub 20 connected to twisted wire pairs 30 via connections 1, 2, 3 and 6. Structured cable 35 typically comprises 4 twisted wire pairs 30.

A data pair is connected across the primary of each data transformer 50 in PD 40 and a second end of each twisted wire pair 30 is connected across the secondary of each data transformer 50 in PD 40 via respective connections, listed conventionally in two groups: connections 1, 2, 3, 6; and connections 4, 5, 7 and 8. The inputs of first diode bridge 65 are respectively connected to the center taps of the secondary windings of data transformers 50 of PD 40 connected to twisted wire pairs 30 via connections 1, 2, 3 and 6. The inputs of second diode bridge 65 are respectively connected to the center taps of the secondary windings of data transformers 50 of PD 40 connected to twisted wire pairs 30 via connections 4, 5, 7 and 8. The positive outputs of first and second diode bridges 65 are commonly connected to the positive input of PD interface 70, and the returns of first and second diode bridges 65 are commonly connected to the return of PD interface 70. PD interface 70 is illustrated as having a pass through connection from the positive input to the positive output thereof, and power for each of UVLO circuit 100, signature impedance 110 and class current source 120 are provided there from (not shown). PD interface 70 is illustrated as having a pass through connection from the return input to the return output thereof, and a return for each of UVLO circuit 100, signature impedance 110 and class current source 120 are provided there from (not shown). Electronically controlled switch 80 is arranged to provide a switchable connection between the return of PD load circuitry 90 and the return of PD interface 70, and electronically controlled switch 80 is responsive to an output of UVLO circuit 100, indicative that received power is reliable and is denoted PG. The positive input of PD load circuitry 90 is connected to the positive output of PD interface 70.

Powering arrangement 10 has been illustrated in an embodiment wherein electronically controlled switch 80 is connected in the return path, however this is not meant to be limiting in any way, and is simply meant as a depiction of one embodiment of alternative A powering known to those skilled in the art. Similarly, PSE 60 is illustrated as being part of switch/hub 20 however this is not meant to be limiting in any way, and midspan equipment may be utilized to provide a connection for PSE 60 without exceeding the scope. PSE 60 may be any equipment arranged to provide power over communication cabling, including equipment meeting the definition of a PSE under any of IEEE 802.3af; IEEE 802.3at; and the above mentioned HDBaseT specification, without limitation.

In operation, electronically controlled switch 80 is initially set to isolate PD load circuitry 90 from PSE 60. PSE 60 detects PD 40 utilizing detection functionality 62 in cooperation with signature impedance 110 presented by PD interface 70. After detection, PSE 60 optionally presents a classification voltage to PD 40 utilizing classification functionality 64, and class current source 120 is arranged to drive a predetermined current indicative of the power requirements of PD load circuitry 90 responsive to the presented classification voltage, thus indicating to PSE 60 the power requirements thereof The amount of current is detected by classification functionality 64. Optionally, PSE 60 further provides PD 40 with information regarding the powering ability of PSE 60 by providing a plurality of classification events separated by mark events, with the information provided by the number of classification events. The mark events function to define the individual classification events. A class event counter, if supplied, is arranged to count the classification events and output information regarding the counted classification events to PD load circuitry 90, thus providing PD load circuitry 90 with information regarding the powering ability of PSE 60.

PSE 60 is further arranged, in the event that sufficient power is available to support the power requirements detected and output by classification functionality 64, to provide operating power for PD 40 over 2 twisted wire pairs 30 of structured cable 35 by raising the voltage above the classification voltage range responsive to powering functionality 66. First diode bridge 65 is arranged to ensure that power received by PD interface 70 and PD load circuitry 90 is at a predetermined polarity irrespective of the connection polarity of PSE 60. UVLO circuit 100 is arranged to maintain isolation between PSE 60 and PD load circuitry 90 until a predetermined operating voltage has been achieved across PD interface 70, and upon sensing the predetermined operating voltage UVLO circuit 100 is further arranged to assert output PG thus closing electronically controlled switch 80 thereby providing power to PD load circuitry 90. Optionally, a timer (not shown) may be provided to ensure that the startup phase is complete prior to closing electronically controlled switch 80.

FIG. 1B illustrates a high level schematic diagram of an alternative B PoE powering arrangement 200, according to the prior art, comprising: a switch/hub 20; a plurality of twisted wire pairs 30 constituted within a structured cable 35; and a PD 40. Alternative B PoE powering arrangement 200 is in all respects identical to alternative A PoE powering arrangement 10 with the exception that the outputs of PSE 60 are respectively connected to the center taps of the secondary windings of data transformers 50 of switch/hub 20 connected to twisted wire pairs 30 via connections 4, 5, 7 and 8. The operation of alternative B PoE powering arrangement 200 is in all respects identical to alternative A PoE powering arrangement 10, and in the interest of brevity will not be further detailed.

FIG. 1C illustrates a high level schematic diagram of a PoE powering arrangement 300 utilizing twin PSEs to provide power to a PD over 4 twisted wire pairs, in accordance with the prior art, comprising: a switch/hub 20; a plurality of twisted wire pairs 30 constituted within a structured cable 35; and a PD 40. PoE powering arrangement 300 is in all respects identical to alternative A PoE powering arrangement 10 and alternative B PoE powering arrangement 200 with the exception that a first and a second PSE 60 are supplied, the outputs of first PSE 60 respectively connected to the center taps of the secondary windings of data transformers 50 of switch/hub 20 connected to twisted wire pairs 30 via connections 1, 2, 3 and 6, representing a first powering path, and the output of second PSE 60 connected to the center taps of the secondary windings of data transformers 50 of switch/hub 20 connected to twisted wire pairs 30 via connections 4, 5, 7 and 8, representing a second powering path. A communication link is provided between the first PSE 60 and second PSE 60 to provide for the required coordination, as will be described further. For simplicity, the details of PSE 60 are omitted. The operation of PoE powering arrangement 300 is in all respects identical to alternative A PoE powering arrangement 10 and alternative B PoE powering arrangement 200 with the exception that power is supplied by each of first PSE 60 and second PSE 60.

FIG. 1D illustrates the voltage waveform outputs from first PSE 60, denoted waveform 350, and the voltage waveform output from second PSE 60, denoted waveform 360, both as experienced at PD interface 70, in accordance with PoE powering arrangement 300 and in accordance with the prior art, wherein the x-axis represents time and the y-axis represents voltage in arbitrary units. In order to avoid interference, first PSE 60 performs detection of signature impedance 110, and after completion of the detection, second PSE 60 performs detection of signature impedance 110, with the timing coordinated by the communication link between first PSE 60 and second PSE 60. After both first PSE 60 and second PSE 60 have performed detection, first PSE 60 performs classification in cooperation with class current source 120, and then second PSE 60 performs classification in cooperation with class current source 120. Finally, powering is performed, preferably simultaneously, responsive to the communication link, by each of first PSE 60 and second PSE 60.

In the event that PD 40, arranged to receive power over all 4 twisted wire pairs, is connected between the detection performed by first PSE 60 and detection performed by second PSE 60, as shown by dotted line 370, a problem occurs. Specifically, first PSE 60 will not provide power on its 2 twisted wire pairs, since detection has failed, whereas second PSE 60 will provide power on its 2 twisted wire pairs. PD 40, which is arranged to receive power over all 4 twisted wire pairs, will only receive power from second PSE 60, which may be insufficient for proper operation. Unless PD 40 completely shuts down, detection will not be performed again by first PSE 60, since power appears on the twisted wire pairs connected thereto as provided by second PSE 60. Such a condition is problematic as it leads to unexpected results.

SUMMARY OF THE INVENTION

Accordingly, it is a principal object of the present invention to overcome the disadvantages of prior art in powering remote devices. This is provided in the present invention by a method of detection in which two PSEs associated with a single PD initiate a simultaneous detection phase prior to performing independent detection. In the event that the simultaneous detection is indicative that no PD is connected on either path, i.e. both PSEs return a high impedance result, powering of the PD is not performed by either of the PSEs. In one embodiment, alternate detection is not performed in the event that the simultaneous detection is indicative that no PD is connected on either path.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1A illustrates a high level block diagram of a first alternative PoE powering arrangement known to the prior art;

FIG. 1C illustrates a high level block diagram of an alternative PoE powering arrangement known to the prior art, wherein power is supplied to a PD from a first and a second PSE;

FIG. 1D illustrates the voltage waveform outputs from the first and second PSE of the powering arrangement of FIG. 1C known to the prior art;

DETAILED DESCRIPTION OF THE PREFERRED EMBODIMENTS

Figure 1B:
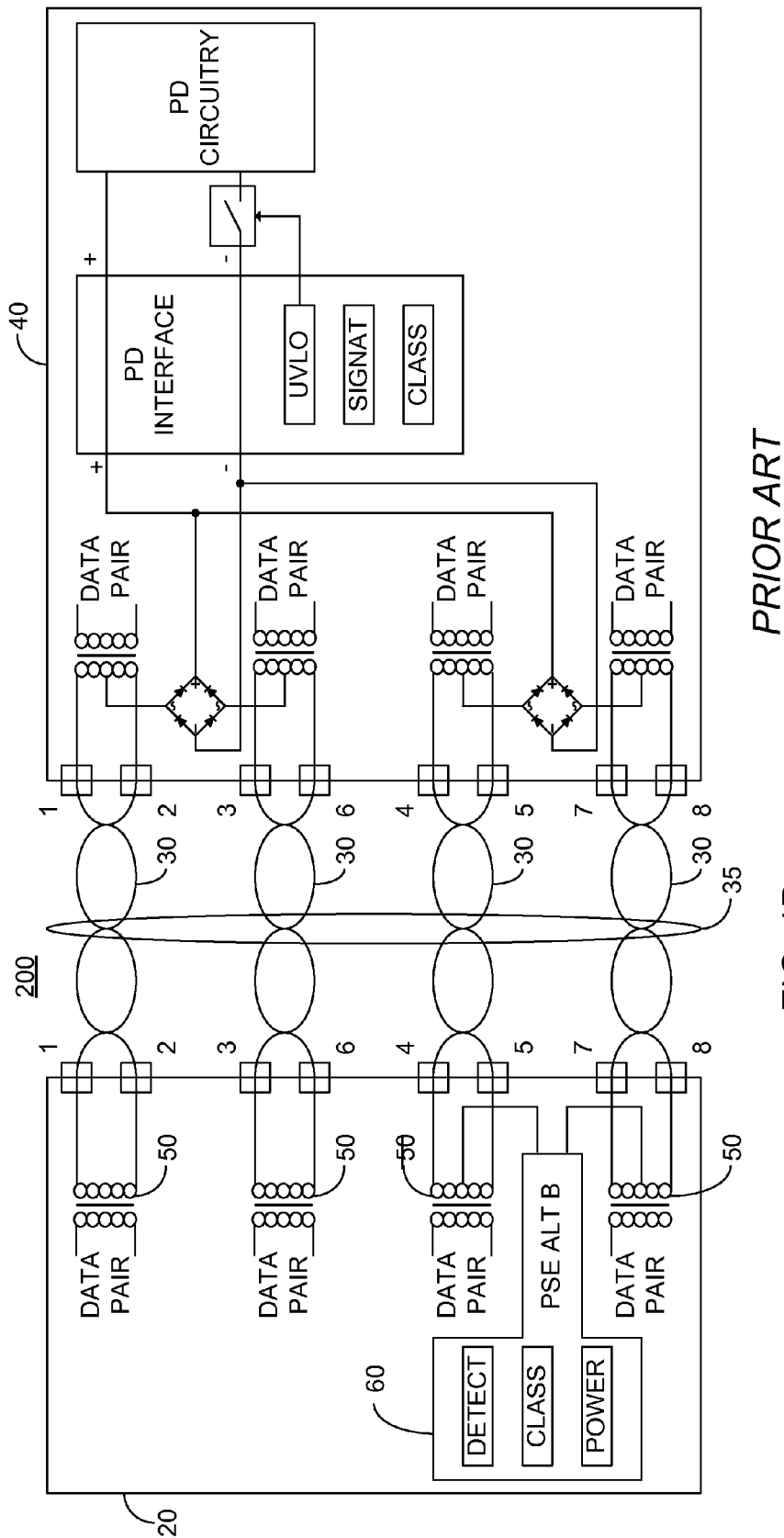
FIG. 1B illustrates a high level block diagram of a second alternative PoE powering arrangement known to the prior art.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The invention is being described as an Ethernet based network, with a powered device being connected thereto. It is to be understood that the powered device is preferably an IEEE 802.3 compliant device preferably employing a 10Base-T, 100Base-T or 1000Base-T connection.

Figure 2:
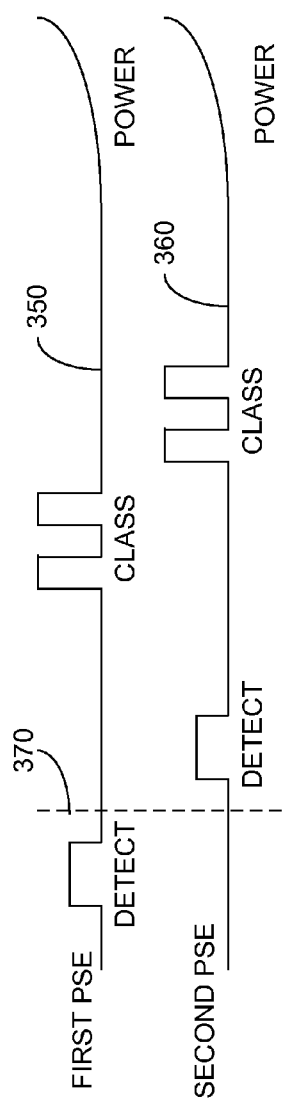
FIG. 2 illustrates a high level block diagram of an exemplary twin PSE, each of the constituent PSEs comprising a control circuitry.
Figure 2:
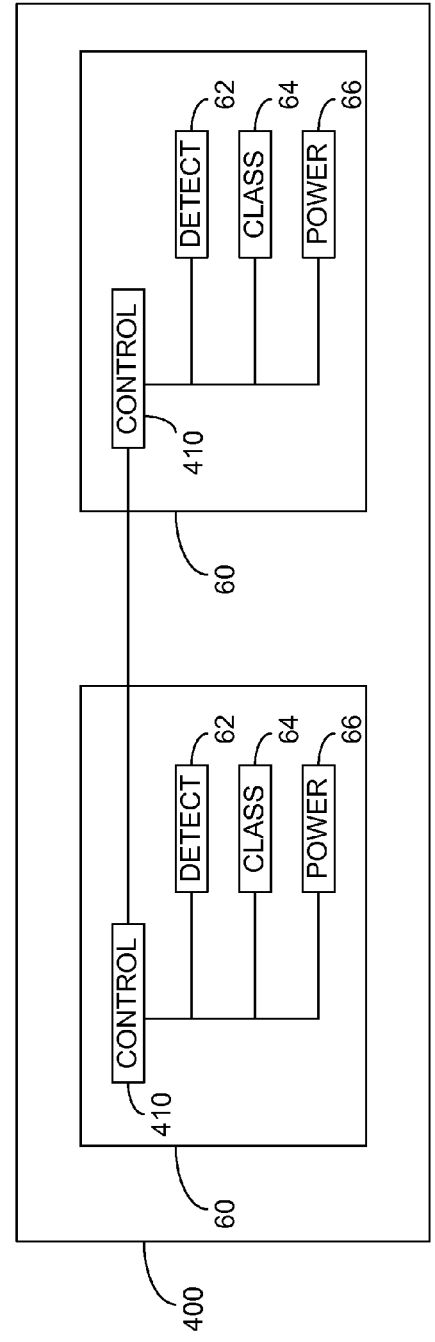

FIG. 2 illustrates a high level block diagram of an exemplary twin PSE 400 comprising a first PSE 60 and a second PSE 60. Each PSE 60 comprises: a control circuitry 410; a detection functionality 62, a classification functionality 64 and a powering functionality 66, each of which may be constituted in a dedicated circuitry, or as a programmed functionality for a computing element, without limitation. Control circuitry 410 of each PSE 60 is in communication with each of the respective detection functionality 62, classification functionality 64 and powering functionality 66. Control circuitry 410 of a first PSE 60 of twin PSE 400 is in communication with a control circuitry 410 of a second PSE 60 of twin PSE 400. In one embodiment (not shown) a single master control circuitry is supplied for both PSEs 60 of twin PSE 400. In one embodiment, each control circuitry 410 of twin PSE 400 can act as a master control circuitry, or as a slave control circuitry, with the other control circuitry 410 of twin PSE 400 respectively acting as a slave control circuitry or master control circuitry. The operation of twin PSE 400 will be described further below in relation to FIGS. 3-5.

Figure 3:
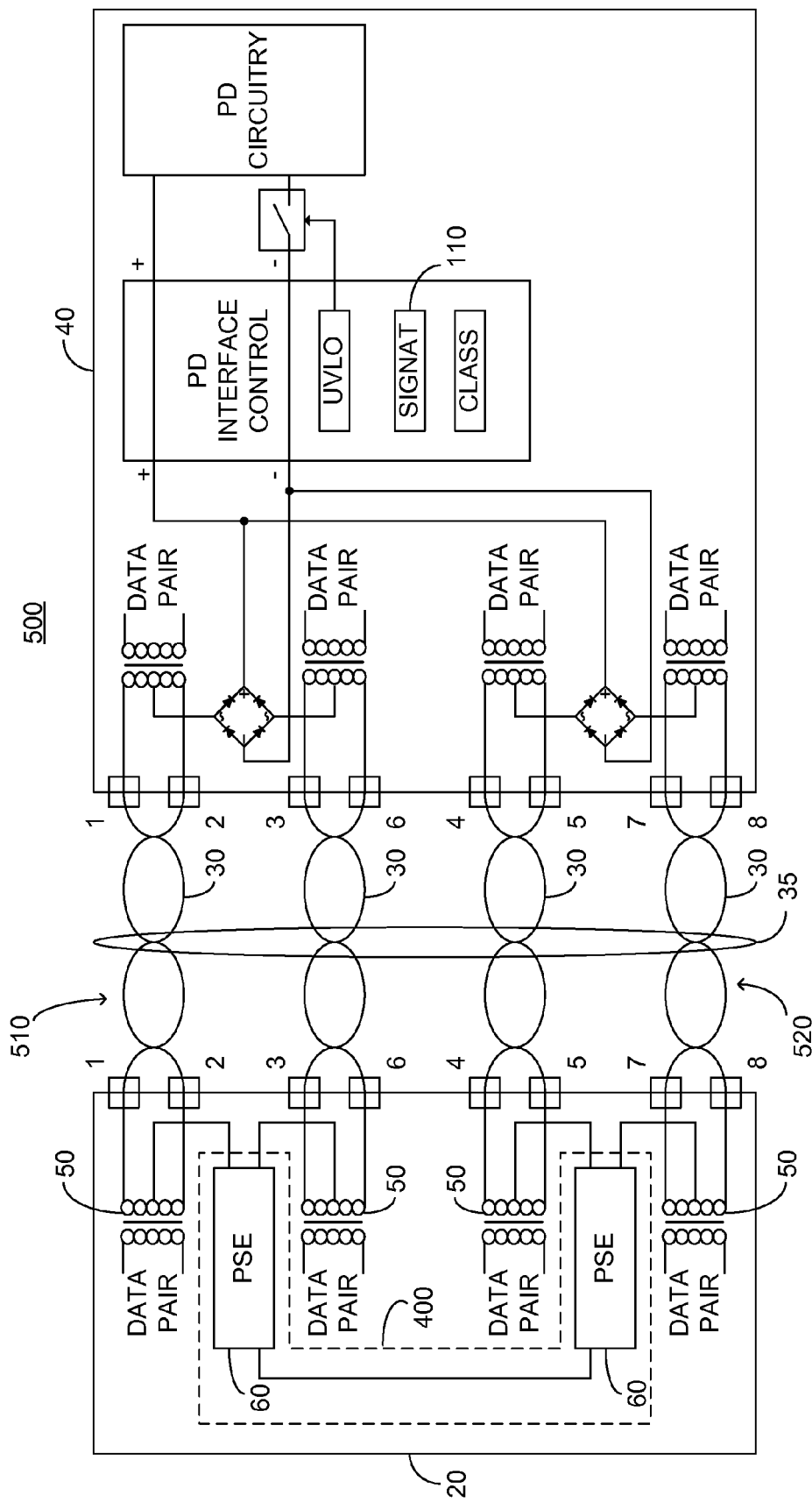
FIG. 3 illustrates a high level block diagram of an exemplary network configuration for remote powering from a twin PSE.

FIG. 3 illustrates a high level block diagram of an exemplary network configuration 500 for remote powering from a twin PSE 400. Network configuration 500 is in all respects identical with network configuration 300, with the exception that the PSEs 60 are combined into a single twin PSE 400, and whose operation is in accordance with the description below. As described above first PSE 60 is connected over a first path 510 to provide power to PD 40, first path 510 constituted of two twisted wire pairs 30 via connections 1, 2, 3 and 6. Second PSE 60 is connected over a second path 520 to provide power to PD 40, second path 520 constituted of two twisted wire pairs 30 via connections 4, 5, 7 and 8.

Figure 4:
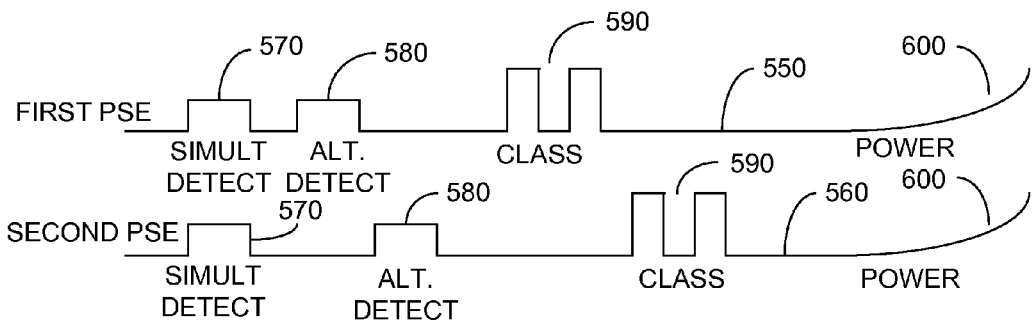
FIG. 4 illustrates an exemplary embodiment of the voltage waveform outputs from the first and second PSE of the twin PSE of FIG. 3.

FIG. 4 illustrates an exemplary embodiment of the voltage waveform outputs from the first PSE 60, denoted waveform 550 and second PSE 60 of the twin PSE 400, denoted waveform 560, both as experienced at PD interface 70, in accordance with network configuration 500, wherein the x-axis represents time and the y-axis represents voltage in arbitrary units. First PSE 60 and second PSE 60 innovatively first perform simultaneous detection 570 on each of first path 510 and second 520, responsive to the respective control circuitry 410 and detection functionality 62, as illustrated on the left side of each of waveforms 550 and 560. Responsive to certain conditions, as will be described further below in relation to FIG. 5, alternate detection 580 is performed by each of first PSE 60 over first path 510 and second PSE 60 over second path 520, responsive to the respective control circuitry 410 and detection functionality 62. Optionally, and responsive to certain conditions, as will be described further below, classification 590 is performed by each of first PSE 60 over first path 510 and second PSE 60 over second path 520, alternately, responsive to the respective control circuitry 410 and classification functionality 64. Finally, responsive to certain conditions, as will be described further below, powering of PD 40 is performed, as shown at 600, preferably simultaneously, by each of first PSE 60 over first path 510 and second PSE 60 over second path 520, alternately, responsive to the respective control circuitry 410 and powering functionality 66.

The above is illustrated in an embodiment wherein classification is not performed after simultaneous detection 570, however this is not meant to be limiting in any way. In other embodiments each of first PSE 60 and second PSE 60 perform classification after simultaneous detection 570 prior to performing alternate detection 580. In one embodiment the results of the classification performed after simultaneous detection are discarded.

Figure 5:
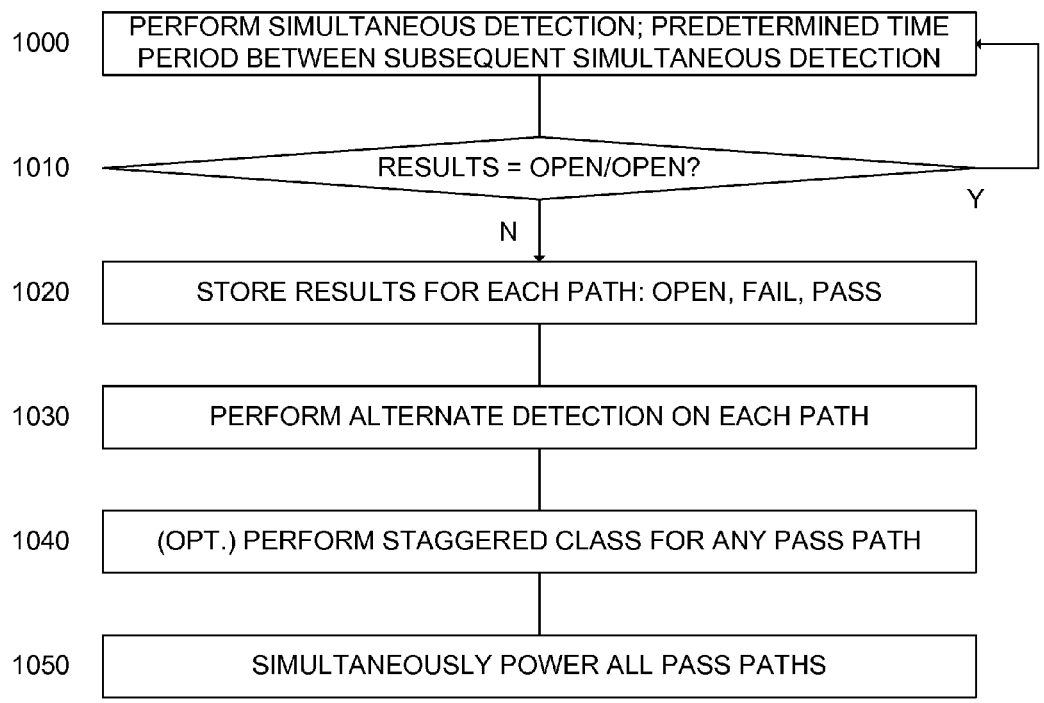
FIG. 5 illustrates an exemplary high level flow chart of the operation of the twin PSE of FIG. 3 to detect and provide power to a PD.

FIG. 5 illustrates an exemplary high level flow chart of the operation of the twin PSE 400 to detect and provide power to PD 40. In stage 1000, simultaneous detection of PD 40 is performed by each of first PSE 60 over first path 510 and second PSE 60 over second path 520. It is to be understood that simultaneous detection may be performed as described in any of the above mentioned standards, thus requiring a plurality of detection voltages at a plurality of time intervals, or may be performed as described in U.S. Pat. No. 7,849,343 issued Dec. 7, 2010 to Darshan, et al, the entire contents of which is incorporated herein by reference, thus requiring a single detection voltage, without limitation. The detection voltage of U.S. Pat. No. 7,849,343 may be lower than the detection voltage defined in the above mentioned standards, however for the purposes of this document, any voltage lower than the maximum allowed detection voltage according the above mentioned standards, and thus does not trigger a classification current source, is considered a detection voltage.

In stage 1010, the results of the simultaneous detection of stage 1000 are examined. In the event that the results of the simultaneous detection are indicative that both powering path 510 and powering path 520 are open, i.e. PD 40 is not detected, stage 1000 is again performed. Preferably, stage 1000 is performed only periodically, and thus a predetermined time period is delayed between subsequent simultaneous detections of stage 1000. The definition of an open powering path is one that exhibits an impedance well in excess of a valid PD. In one particular embodiment, and impedance detected in excess of 100K is determined to be an open powering path.

In the event that in stage 1010 the results of the simultaneous detection are not indicative that both powering path 510 and powering path 520 are open, in stage 1020, the actual results of the simultaneous detection of stage 1000 are stored, preferably in a local memory of control circuitry 410. In an exemplary embodiment, the results of the simultaneous detection are categorized as one of: open; fail and pass. The term pass is meant to be synonymous with a valid detection of PD 40, i.e. the detection of a valid signature impedance 110, in accordance with the relevant specification, or pre-determined values. The term fail is meant to include the detection of any value which is not a valid signature impedance 110, and is not defined as an open condition as described above.

Optionally, as described above, classification is performed over each of powering path 510, 520 following the simultaneous detection of stage 1000. In one embodiment, the results of the classification are discarded.

In stage 1030, first PSE 60 and second PSE 60 perform alternate detection on the respective power path 510, 520. The term alternate as used herein is synonymous with the term staggered, in that the detection are performed such that the waveforms do not overlap with time. Performing the detection alternately prevents interference between detection functionalities 62 of first PSE 60 and second PSE 60.

In one embodiment, the stored results of stage 1020 are utilized to determine which control circuitry 410 acts as a master control circuitry, and which control circuitry 410 thus acts as a slave control circuitry. In such an embodiment, the control circuitry 410 whose associated detection functionality 62 returns a pass value sets itself as the master, and instructs the other control circuitry 410 to act as a slave. In the event that both detection functionalities 62 return a pass value, a predetermined one of the two control circuitries 410 asserts itself as master. In one embodiment, the master controls the timing of both the PSE 60 of which it is part, and the timing of the PSE 60 of the slave control circuitry 410.

In optional stage 1040, control circuitry 410 of any PSE 60 returning a pass value during the alternate detection performs classification utilizing the respective classification functionality 64. It is to be understood that the term pass, is not restricted to the definition in the above mentioned standards, and other definitions, such as the detection of a predetermined capacitance as signature impedance 110 may be utilized without exceeding the scope.

In stage 1050, all paths for which detection functionality 62 has returned a pass value during the alternate detection of stage 1030 are powered. Preferably, powering of a plurality of paths 510, 520 is performed simultaneously. The term simultaneous is not meant to be exact, and may include a delay between powering small enough to prevent damage to either PSE 60. In one embodiment, the term simultaneous means within 100 microseconds.

The above flow can be modified to detect various non-standard implementations. Thus, for example certain embodiments present a valid signature impedance to the simultaneous detection of stage 1000, thus resulting in a pass value for each of first PSE 60 and second PSE 60, while presenting ½ of a valid signature impedance to each of the alternate detections of stage 1030. The values of the simultaneous detection are stored in stage 1020, and thus the raw result of the alternate detection of stage 1030 may be modified to take this result into account. In particular, in such an embodiment, a result in stage 1000 of pass, for each PSE 60, and a result of fail for each PSE 60 in stage 1030 results in reclassification of the fail values to pass, and thus the simultaneous powering of both paths 510, 520.

The above has been described in an embodiment wherein in the event that stage 1000 presents an open condition for both paths 510 and 520, alternate detection of stage 1030 is not performed, however this is not meant to be limiting in any way. In an alternative embodiment, an open condition for both paths 510 and 520 is utilized as a gating condition for the powering of stage 1050, without limitation. In such an embodiment, the powering of stage 1050 does not occur in the event that stage 1000 presents an open condition for both paths 510 and 520.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A local area network adapted to supply power to a plurality of types of powered devices over communication cabling, the local area network comprising:
   a powered device;
   a first power sourcing equipment;
   a second power sourcing equipment; and
   a communication cabling comprising a plurality of twisted wire pairs arranged to connect said first and second power sourcing equipment to said powered device, said communication cabling providing a first power path comprising a first set of twisted wire pairs of said communication cabling between said first power sourcing equipment and said powered device and a second power path comprising a second set of twisted wire pairs of said communication cabling between said second power sourcing equipment and said powered device, said first set different from said second set,
   said first and second power sourcing equipments arranged to:
      simultaneously perform detection of the powered device by each applying a detection voltage to said powered device via the respective one of the first path and the second path to detect said powered device, and determine whether said powered device is present or absent; and
      in the event that at least one of said first and second power sourcing equipments detects the presence of the powered device by said simultaneous detection, alternately perform detection of the powered device by each alternately applying the detection voltage to said powered device via the respective one of the first path and the second path to detect a signature impedance; and
      in the event that each of said alternate detection is indicative of the presence of the signature impedance, provide power to said powered device simultaneously by said first and second power sourcing equipment,
      wherein the power is not provided to said powered device from either the first power sourcing equipment or the second power sourcing equipment in the event that said simultaneous detection is indicative of the absence of the powered device on each of the first path and the second path, and
      wherein in the event that said simultaneous detection is indicative of the absence of the powered device on each of the first path and the second path, said first and second power sourcing equipments do not alternately perform the detection.

2. The local area network of claim 1, wherein each of said first and second power sourcing equipments are further arranged to perform classification on the respective one of the first and second paths responsive to successful detection of the signature impedance on the respective path by the respective one of the first and second power sourcing equipments, the classification classifying the power requirements of the powered device.

3. The local area network of claim 2, wherein in the event that only one of said alternate detection is indicative of the presence of the signature impedance, power is provided to said powered device by the respective one of said first and second power sourcing equipment associated with the detection of the presence of the signature impedance, the power provided subsequent to the performed classification.

4. The local area network of claim 1, wherein in the event that only one of said alternate detection is indicative of the presence of the signature impedance, power is provided to said powered device by the respective one of said first and second power sourcing equipment associated with the detection of the presence of the signature impedance.

5. A local area network adapted to supply power to a plurality of types of powered devices over communication cabling, the local area network comprising:
   a powered device;
   a first power sourcing equipment;
   a second power sourcing equipment; and
   a communication cabling comprising a plurality of twisted wire pairs arranged to connect said first and second power sourcing equipment to said powered device, said communication cabling providing a first power path comprising a first set of twisted wire pairs of said communication cabling between said first power sourcing equipment and said powered device and a second power path comprising a second set of twisted wire pairs of said communication cabling between said second power sourcing equipment and said powered device, said first set different from said second set,
   said first and second power sourcing equipments arranged to:
      simultaneously perform detection of the powered device by each applying a detection voltage to said powered device via the respective one of the first path and the second path to detect said powered device, and determine whether said powered device is present or absent; and
      in the event that at least one of said first and second power sourcing equipments detects the presence of the powered device by said simultaneous detection, alternately perform detection of the powered device by each alternately applying the detection voltage to said powered device via the respective one of the first path and the second path to detect a signature impedance; and
      in the event that each of said alternate detection is indicative of the presence of the signature impedance, provide power to said powered device simultaneously by said first and second power sourcing equipment,
      wherein the power is not provided to said powered device from either the first power sourcing equipment or the second power sourcing equipment in the event that said simultaneous detection is indicative of the absence of the powered device on each of the first path and the second path, and
      wherein in the event that said simultaneous detection is indicative of the absence of the powered device on each of the first path and the second path, said simultaneously performed detection is repeated after a predetermined time interval.

6. A twin power sourcing equipment comprising:
   a first power sourcing equipment arranged for connection to a powered device over a first power path;
   a second power sourcing equipment arranged for connection to the powered device over a second power path, said second power path different from said first power path;
   said first and second power sourcing equipments arranged to:
      simultaneously perform detection of the powered device by each applying a detection voltage to the powered device via the respective one of the first path and the second path to detect the powered device, and determine whether the powered device is present or absent; and in the event that at least one of said first and second power sourcing equipments detects the presence of the powered device by said simultaneous detection, alternately perform detection of the powered device by each alternately applying the detection voltage to the powered device via the respective one of the first path and the second path to detect a signature impedance; and in the event that each of said alternate detection is indicative of the presence of the signature impedance, provide power to the powered device simultaneously by said first and second power sourcing equipment, wherein the power is not provided to the powered device from either the first power sourcing equipment or the second power sourcing equipment in the event that said simultaneous detection is indicative of the absence of the powered device on each of the first path and the second path, and wherein in the event that said simultaneous detection is indicative of the absence of the powered device on each of the first path and the second path, said first and second power sourcing equipments do not alternately perform the detection.

7. The twin power sourcing equipment of claim 6, wherein each of said first and second power sourcing equipments are further arranged to perform classification on the respective one of the first and second paths responsive to successful detection of the signature impedance on the respective path by the respective one of the first and second power sourcing equipments, the classification classifying the power requirements of the powered device.

8. The twin power sourcing equipment of claim 7, wherein in the event that only one of said alternate detection is indicative of the presence of the signature impedance, power is provided to the powered device by the respective one of said first and second power sourcing equipment associated with the detection of the presence of the signature impedance, the power provided subsequent to the performed classification.

9. The twin power sourcing equipment of claim 6, wherein in the event that only one of said alternate detection is indicative of the presence of the signature impedance, power is provided to the powered device by the respective one of said first and second power sourcing equipment associated with the detection of the presence of the signature impedance.

10. A twin power sourcing equipment comprising:
a first power sourcing equipment arranged for connection to a powered device over a first power path;
a second power sourcing equipment arranged for connection to the powered device over a second power path, said second power path different from said first power path;
said first and second power sourcing equipments arranged to:
simultaneously perform detection of the powered device by each applying a detection voltage to the powered device via the respective one of the first path and the second path to detect the powered device, and determine whether the powered device is present or absent; and
in the event that at least one of said first and second power sourcing equipments detects the presence of the powered device by said simultaneous detection, alternately perform detection of the powered device by each alternately applying the detection voltage to the powered device via the respective one of the first path and the second path to detect a signature impedance; and in the event that each of said alternate detection is indicative of the presence of the signature impedance, provide power to the powered device simultaneously by said first and second power sourcing equipment, wherein the power is not provided to the powered device from either the first power sourcing equipment or the second power sourcing equipment in the event that said simultaneous detection is indicative of the absence of the powered device on each of the first path and the second path, and wherein in the event that said simultaneous detection is indicative of the absence of the powered device on each of the first path and the second path, said simultaneously performed detection is repeated after a predetermined time interval.

11. A method of providing power from a first power sourcing equipment arranged for connection to a powered device over a first power path and a second power sourcing equipment arranged for connection to the powered device over a second power path, the second power path different from said first power path, the method comprising:
simultaneously determining, for each of the first power sourcing equipment and the second power sourcing equipment, whether the powered device is present or absent;

in the event the powered device is determined to be present by either the first power sourcing equipment or the second power sourcing equipment, alternately performing detection of the powered device via the respective one of the first path and the second path to detect a signature impedance;

in the event that each of said alternate detection is indicative of the presence of the signature impedance, providing power to said powered device simultaneously by said first and second power sourcing equipment;

performing classification on the respective one of the first and second paths by each of said first and second power sourcing equipments responsive to successful detection of the signature impedance on the respective path by the respective one of the first and second power sourcing equipments, the classification classifying the power requirements of the powered device; and in the event that only one of said alternate detection is indicative of the presence of the signature impedance, providing power to said powered device by the respective one of said first and second power sourcing equipment associated with the detection of the presence of the signature impedance, the power provided subsequent to the performed classification, wherein said power is not provided to said powered device from either the first power sourcing equipment or the second power sourcing equipment in the event that the powered device is determined to be absent by each of the first power sourcing equipment and the second power sourcing equipment during said simultaneous determining.

12. The method of claim 11, wherein said simultaneously determining comprises:
simultaneously performing detection of the powered device by each applying a detection voltage to said powered device via the respective one of the first path and the second path to detect said powered device, the powered device determined to be present in the event that at least one of said first and second power sourcing equipments detects the presence of the powered device by said simultaneous detection and the powered device determined to be absent in the event that both said first and second power sourcing equipments detect the absence of the powered device by said simultaneous detection, and wherein said alternately performing detection comprises alternately applying the detection voltage to said powered device via the respective one of the first path and the second path to detect a signature impedance.

13. The method of claim 11, wherein in the event that the powered device is determined to be absent, said alternate detection is not performed.

14. A method of providing power from a first power sourcing equipment arranged for connection to a powered device over a first power path and a second power sourcing equipment arranged for connection to the powered device over a second power path, the second power path different from said first power path, the method comprising:

simultaneously determining, for each of the first power sourcing equipment and the second power sourcing equipment, whether the powered device is present or absent;

in the event the powered device is determined to be present by either the first power sourcing equipment or the second power sourcing equipment, alternately performing detection of the powered device via the respective one of the first path and the second path to detect a signature impedance; and in the event that each of said alternate detection is indicative of the presence of the signature impedance, providing power to said powered device simultaneously by said first and second power sourcing equipment, wherein in the event that the powered device is determined to be absent by each of the first power sourcing equipment and the second power sourcing equipment during said simultaneous determining, said determining is repeated after a predetermined time interval.

* * * * *